Nov. 5, 1940.  J. C. MURRAY  2,220,536
BOOKLET
Filed Dec. 12, 1939   3 Sheets-Sheet 2
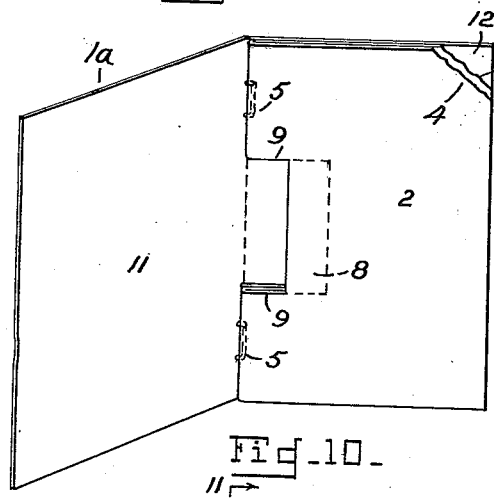
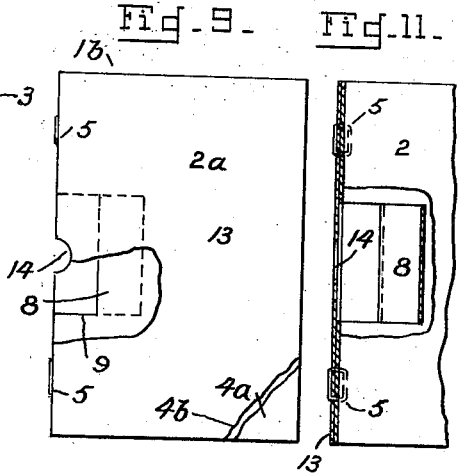
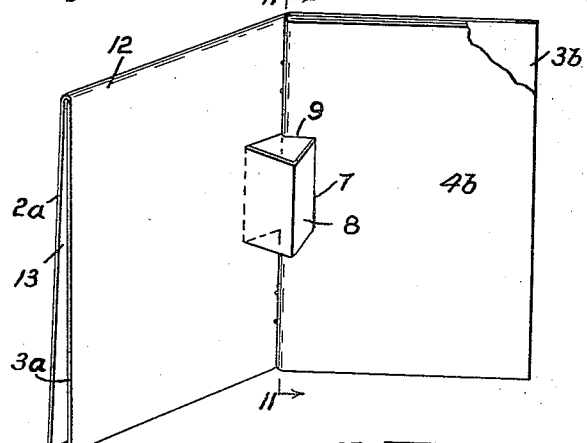
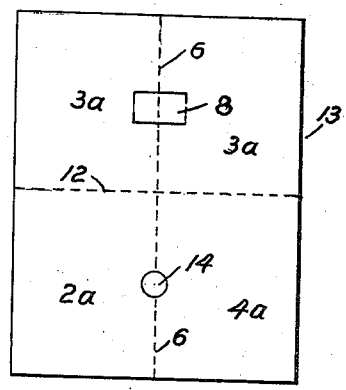
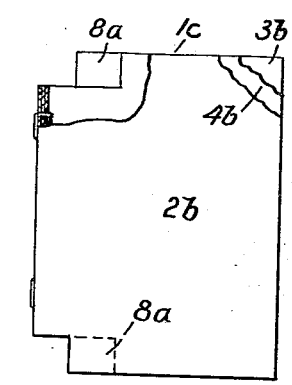
Inventor:
John Canice Murray,
By C. C. Hines,
Attorney.

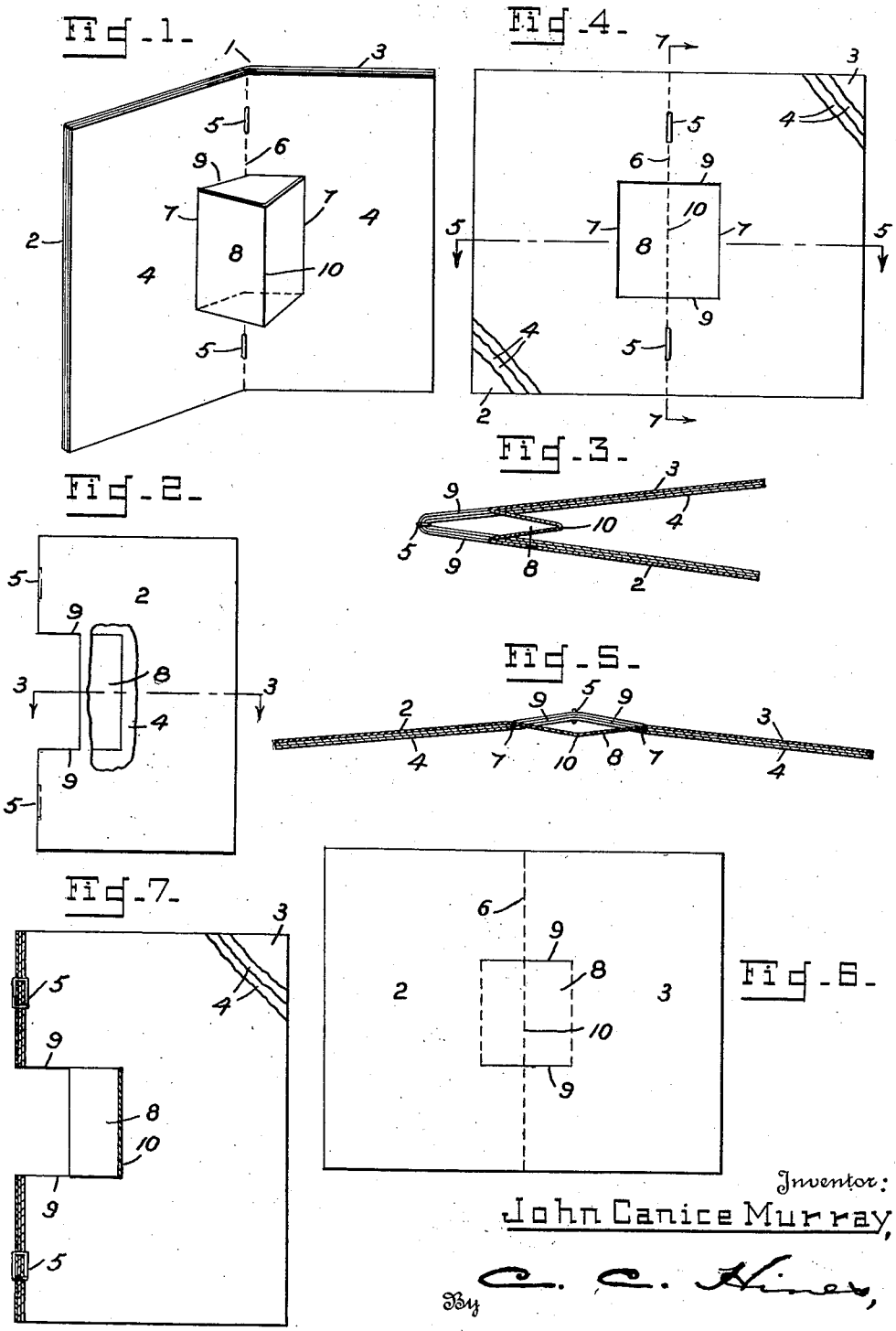

Nov. 5, 1940.  J. C. MURRAY  2,220,536
BOOKLET
Filed Dec. 12, 1939  3 Sheets-Sheet 3
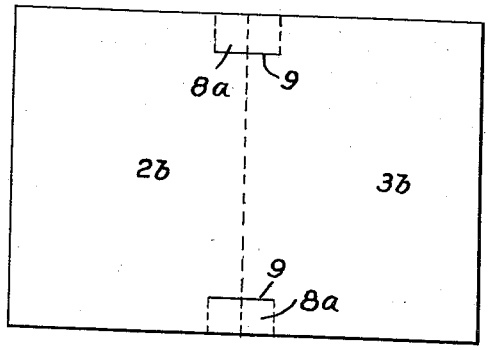
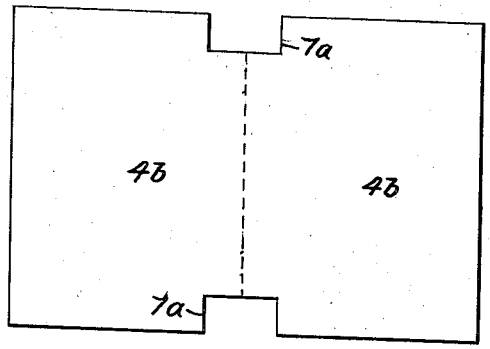
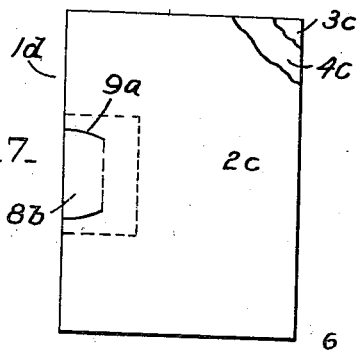
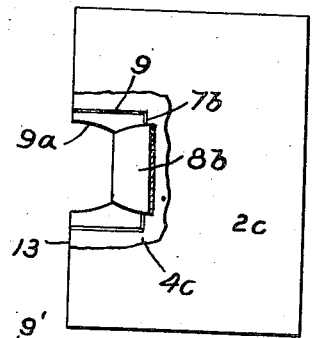
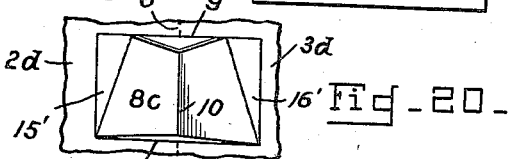
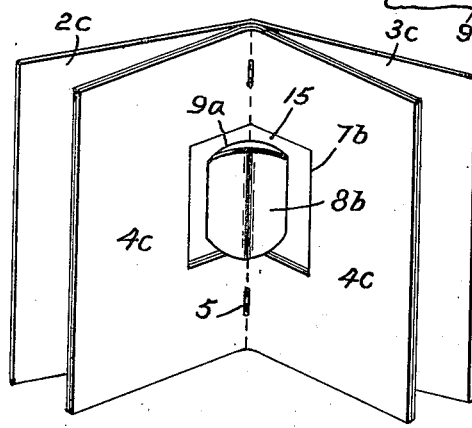
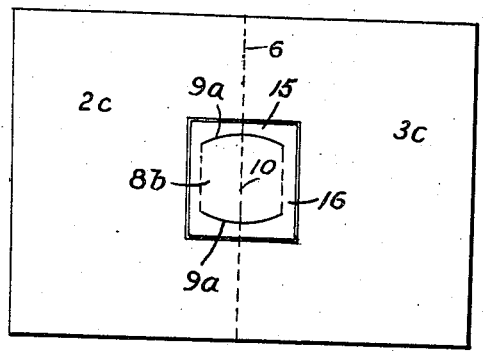
INVENTOR.
John Canice Murray
BY
ATTORNEY.

Patented Nov. 5, 1940

2,220,536

UNITED STATES PATENT OFFICE 2,220,536

BOOKLET

John Canice Murray, Yonkers, N. Y.

Application December 12, 1939, Serial No. 308,874

7 Claims. (Cl. 281—15)

This invention relates to advertising or reference booklets intended for daily or other periodical or casual reference use, and containing in whole or in part advertising and topical or other reference matters, or matters of general or special interest. Booklets of the character to which my invention relates are very generally used for advertising purposes and distributed gratuitously by manufacturers to the public, or are supplied by manufacturers to dealers in their goods with the business cards of the dealers printed thereon, or with a display space left blank so that dealer may have his business card printed therein if desired, the booklets in such cases being distributed by the dealers. In one form of advertising booklet commonly supplied by manufacturers to dealers in their goods, the dealer's name is usually printed on the front or back cover of the booklet. The dealer's name, therefore, is displayed only to an observer when the booklet is closed and a person reading the booklet does not see the name at all as he reads the inside pages. In another ordinary form of advertising booklet supplied by manufacturers to their dealers, the booklet is bound in a cover of cardboard or the like, the cover having a portion projecting beyond the booklet on which the dealer's name is printed. While in this case the name of the dealer may be arranged so that it may be constantly seen, very often the portion of the cover bearing the dealer's name is cut off by a user objecting to such a prominent advertising display, so that the value of the advertising matter is lost to the dealer.

One object of my invention is to provide a booklet which may bear matter of any suitable general or special interest throughout its pages, and which is provided with a novel construction and arrangement of display opening and a coacting display strip on which the dealer's name or other matter to be prominently displayed may be printed and which is arranged to show through the leaves of the booklet when the booklet is opened at any point.

Another object of the invention is to provide an advertising booklet having a "pop-up" or "pop-out" type of advertising field or display strip which because of its pop-up or pop-out action will act as a surprise feature and attract instant attention upon the booklet being opened.

Still another object of the invention is to provide a booklet in which the advertising or display strip forms an integral part of an element of the booklet and does away with the necessity of hand pasting the ends of an auxiliary strip and otherwise applying it for use to the booklet.

With these and other objects in view, the invention consists of the features of construction, combination and arrangement of parts, hereinafter fully described and claimed, reference being had to the accompanying drawings, in which:

Fig. 1 is a perspective view of one form of advertising booklet embodying my invention, the booklet appearing in open position and with the display strip exposed.

Fig. 2 is a front view of the booklet in closed condition and with a portion of the front leaf broken away to more clearly show the display strip.

Fig. 3 is a section on line 3—3 of Fig. 2 of the partly opened booklet.

Fig. 4 is a face view of the booklet as it appears in fully opened condition at an intermediate point in the booklet.

Fig. 5 is a section on line 5—5 of Fig. 4.

Fig. 6 is a view of the sheet provided with the display strip.

Fig. 7 is a section on line 7—7 of Fig. 4.

Fig. 8 is a view of the form of booklet shown in Figs. 1 to 7, inclusive, provided with outer cover leaves.

Fig. 9 is a front view of a closed booklet of a form illustrating the use of French fold cover and first and final intermediate leaves.

Fig. 10 is a perspective view of the booklet shown in Fig. 9 in opened condition.

Fig. 11 is a section taken substantially on line 11—11 of Fig. 10.

Fig. 12 is a view of the French folded sheet of the booklet shown in Figs. 9, 10 and 11 in outspread condition.

Fig. 13 is a front view of a closed booklet of a form in which the booklet is provided with display strips at the top and bottom thereof.

Fig. 14 is a view of the booklet shown in Fig. 13 in opened condition.

Fig. 15 is a fragmentary view of the outer sheet employed in the form of booklet shown in Figs. 13 and 14.

Fig. 16 is a similar view of one of the inner sheets employed in the form of booklet shown in Figs. 13 and 14.

Fig. 17 is a view similar to Fig. 1 of still another form of booklet.

Fig. 18 is a view of the cover leaves of the booklet shown in Fig. 17 with parts broken away and in section to better show the construction.

Fig. 19 is a view of the booklet shown in Fig. 17 as it appears in opened condition.

Fig. 20 is an inner face view of the cover leaves thereof.

Fig. 21 is a fragmentary view of outer or cover leaves embodying still another form of display panel and display strip.

In the practical embodiment of my invention, as shown in Figs. 1 to 7, inclusive, 1 designates a booklet of generally oblong rectangular form in plan and having its major length in a vertical direction, i. e., perpendicular to the plane of the drawing sheet. This booklet is designed to open and close horizontally and consists of outer leaves 2 and 3, which may serve as front and rear cover leaves, and a plurality of inner leaves 4 hingedly connected at the vertical center of the booklet by staples or other fastening members 5. In the illustrated example, the booklet is shown as composed of a stack of superposed double sheets, which, when assembled, are folded along a central vertical line, as shown at 6, and hingedly bound together along the line of fold by the staples or fastening members 5. By this construction the leaves are arranged in pairs, each leaf being integrally united to an adjacent or fellow leaf, and all the leaves are joined by the fastening members along a flexible point of bend or hinging point which adapts the leaves to be turned or opened and closed without restriction or interference from the fastening members. The form, construction, arrangement and manner of binding the leaves, however, may be varied so long as the essential features of the invention as set forth in the subjoined claims are preserved.

The faces of the leaves may be printed, engraved or lithographed to bear any desired reading, pictorial or other material of general or special interest or information, as well as appropriate advertising matter and the arrangement of the various kinds of matter may be such that related matter of any character may be disposed for ready and convenient reference on the same or adjacent pages of the leaves. The reading matter may be of a kind to be successively read or viewed as the pages of the booklet are opened, or each page of the booklet may be devoted to subject-matter different from that on any other page. Where artistic or other pictures or illustrated matter are printed, engraved or lithographed upon any page or pages, reading or other matter pertinent to the pictures or illustrated matter may be placed upon the same page or pages so as to be conveniently observed with the pictures or illustrations. The pictures, illustrations or reading matter may apply only to the advertised products alone, or embrace matters of household or other interest related to these products, or the pictorial, illustrated and reading matter may be devoted to any desired number or any range of subjects designed to cause interest or amusement or incite more or less frequent reference to the booklet for information purposes.

An important feature of my invention consists in providing such a booklet with a display element which may bear the name, or name and address of the manufacturer or distributor, the trademark of the distributor, or advertising or other subject-matter of any kind designed to be conspicuously displayed, which will show throughout the booklet as the leaves are turned. This display element is also designed to be of a kind having a novel arrangement and movement and which will attract the immediate attention of the reader or observer when he opens the booklet at any point. To this end, I provide the inner leaves 4 with slots 7 of rectangular or other suitable formation, such slots being formed in each doubled inner sheet or pair of companion leaves 4 so as to extend across the fold or hinging line 6 and equidistantly or to equal degrees beyond such line in each of the companion leaves. The sizes of these slots may be such that they will not encroach too greatly on the printing spaces of the leaves, but will at the same time be large enough for effective display of the display element. The display element 8 is carried by the cover leaves 2 and 3 and comprises a strip preferably formed by transversely slitting the leaves 2 and 3 along parallel lines, as indicated at 9, thus separating therefrom at its top and bottom edges the intermediate portion 8 forming the display strip, which is integral with or left intact at its other or side edges with the leaves 2 and 3. The strip 8 so formed extends across the line of fold 6 of the leaves 2 and 3 to equal degrees. It is coextensive in size with the slots 7 in the leaves 4 and arranged so as to register therewith and to be exposed therethrough when the book is opened at any point. The strip 8 is creased or folded vertically at an intermediate point, as indicated at 10, so that it is adapted in the opening and closing movements of the booklet to move backwardly and forwardly through the slots 7 and to fold in V-fashion between the faces of the leaves 4 at the center of the booklet when the booklet is closed, as shown in Fig. 3. When the booklet is opened at any point the strip 8 will unfold and move rearwardly through the slots 7 in the leaves 4 to different angular positions, according to the degree of opening movement of the booklet, or to a straightened position substantially in the plane of the leaves 2 and 3 when the booklet is fully opened. This novel accordion or bellows-like backward and forward movement of the strip 8, as it unfolds and folds, adapts it for effective cooperation with the slots 7 and to be moved into and out of display position without liability of injury in the opening and closing movements of the booklet. Such movements of the display strip provide a "pop-up" or "pop-out" type of display element which gives an interesting and attractive display action and causes the immediate attention of the user of the booklet to be concentrated thereon and on the display matter carried thereby on the opening of the booklet. It will be evident that the display strip provides a portion which may be printed to display the name of the distributor or other matter to which it is desired to call particular attention, and which will show at all times throughout the booklet as the booklet is opened and the pages are turned for reference thereto. It will also be evident that when the booklet is opened at any point the slots 7 in the individual leaves will allow each leaf to be turned without interference with or from the display strip. A booklet of the construction described, and provided with display slots and a display strip of this character, is of distinctive type in allowing matter to be displayed constantly when the booklet is opened and in such a way as to call direct and immediate attention thereto, thus greatly adding to the display and advertising value of the booklet.

The construction of booklet shown in Figs. 1 to 7, inclusive, with slots and strip as above described, is such as to show a gap or opening at its center and in the region of the binding line when the booklet is closed, which does not render the booklet unpresentable and which is of advantage from the standpoint of cost where it is unnecessary that the booklet should externally resemble one of ordinary type. When, however, it is desired to have the booklet externally resemble one of ordinary type, the booklet may be provided, as shown by the booklet 1a in Fig. 8, with external cover leaves 11 and 12 formed of a doubled sheet of the same or a different material from the leaves 2, 3 and 4. These external cover leaves 11 and 12 may bear any desired printed matter, and when the booklet is closed will give the booklet the appearance of a booklet of ordinary type.

In Figs. 9 to 12, inclusive, I have shown the embodiment of my invention in another form of booklet 1b in which certain of the inner leaves 4a may be formed of double leaves similar to the leaves 4 of the booklets previously described, but in which the outer leaves 2a and 3a are herein shown as formed integrally with the first and last inner leaves 4b of the booklet, the leaves 2a, 3a and 4b being formed from a unitary or single four-leaved French-folded sheet 13 of the character illustrated in Fig. 12. This four-leaved sheet is doubled or folded upon itself along the transverse fold line and then folded along the vertical or hinging fold line 6, producing the outer cover leaves 2a and 3a and the inner leaves 4b which are integral at their upper edges with each other. The leaves 4b in this booklet are formed with the display strip 8 for cooperation with slots 7 of the character previously described in the leaves 4a, and the leaves 2a and 3a here serve the function of external cover leaves which when the booklet is closed conceal the slots 7 and display element 8. The structure here provides a booklet similar to the booklet 1a except that the external cover leaves and first and last inner leaves are formed as a unit from a single sheet. This construction requires that the user of the booklet separate the sheets 2a, 3a and 4b at their joined upper edges, but the construction described furnishes some advantages in the manufacture of the booklet. If desired, the inner leaves 4b may also be of French-folded type to secure the manufacturing advantage, in which event, of course, the reader is required to cut the leaves along their joined edges to free them for opening of the booklet. The leaves 2a and 3a of the French-folded portion may be provided centrally along the hinging line with a circular or other suitably shaped weakening cut-out 14 to facilitate the inward bending of the display strip after the booklet is bound.

In Figs. 13 to 16, inclusive, I have shown another form of booklet 1c in which the structure may correspond, so far as the general form of the booklet is concerned, with that shown in Figs. 1 to 7, inclusive, except that the outer leaves 2b and 3b are provided with display strips 8a at the top and bottom portions thereof, while the inner leaves 4b are formed with similarly located slots 7a for cooperation with such strips. The strips are formed by single slits separating them at their relatively inner edges from the leaves 2b and 3b and the slots 7a here open through the upper and lower edges of the inner pages. This construction provides the booklet with a pair of display strips or panels, one at the top and one at the bottom thereof, instead of a single display panel at the center thereof, which top and bottom display panels may be employed to display the same display matter or different display matter, as desired. One of the display strips may be employed, for example, to display the name of the manufacturer and the other employed to advertise the goods or to give a pictorial display of the goods, or one display strip may be used to bear the advertisement of the manufacturer of the goods and the other display strip the name of the dealer or distributor, or the display strips may be employed for other and various display or advertising purposes.

In Figs. 17 to 20 I have shown a form of booklet 1d generally similar to that shown in Figs. 1 to 7, inclusive, except that the outer or cover leaves 2c and 3c are designed to be made of stiffer or heavier paper than the inner leaves 4c and are formed with a display strip 8b of smaller size or area than the slots or windows 7b in the inner leaves. This strip 8b being much smaller in area than the slots avoids any possibility of obstruction to the free opening of the leaves due to rubbing engagement of the strip with the side edges of the slots 7b. By reason of the fact, also, that the strip 8b is of smaller area than the slots 7b, portions of the leaves 2c and 3c will show through the slots 7b and such portions may be made to define a display panel or panels 15, 16, in which may be printed any suitable matter. The display strip 8b in this form is further shown as separated at its upper and lower edges from the leaves 2c and 3c on curved lines 9a giving it a desired shape and area to allow matter to be printed for clear display at the top, bottom and sides of the panel or panels 15, 16. The strip 8b here shown may be shaped and printed to illustrate or simulate two sides or a suitable portion of a box, carton or other receptacle in which a certain product is sold or to illustrate any desired article of manufacture, together with the name of or other matter pertaining to the product or article, or the display strip may simply bear the imprint of the manufacturer or dealer's or distributor's business card. The panels 15, 16 may contain slogans or other advertising matter pertaining to the product or article shown on the display strip, or relating to the business of the manufacturer, dealer or distributor whose name or business card appears on the display strip, or may bear the business card of the manufacturer, dealer or distributor when the strip 8b is used to display a package of goods or article of manufacture. This construction of booklet provides for the very effective display of goods or articles to be sold or the name of the manufacturer or business card of the dealer or distributor in a condensed manner, so that all will show simultaneously through the slots 7b.

Fig. 21 shows a construction of outer or cover leaves 2d and 3d similar to that shown in Fig. 20 except that the top and bottom slits 9' are made relatively short and long and the outer edges of the display strip 8c are connected to the bodies of the leaves so as to hinge or fold and unfold on crease or hinge lines which converge in an upward direction and diverge in a downward direction. This produces a display strip of truncate-triangular general shape bounded at the sides by triangular display panels 15', 16'. This is an instance showing one of many forms in which the display strip may be made by varying the shape or length of the division slits and the angular arrangement of the crease or fold lines with relation to each other. By suitable variations in the slits and creases the display panel may be given various ornamental forms or shapes to simulate different articles or objects.

It is, of course, to be understood that the booklets of any of the forms disclosed may be made in different sizes and embody in their construction one or more sets of display slots and strips arranged in the ways disclosed.

From the foregoing description, taken in connection with the drawings, the construction and mode of use of my improved booklet will be readily understood without a further and extended description, and it will be seen that the invention provides a booklet for the purpose described by means of which a ready reference type of advertising and information booklet, of attractive appearance, may be produced at a low cost, and one in which the "pop-up" or "pop-out" action of a display strip may be used to cause amusement and interest to the user of the booklet as well as to cause instant display of and attention to advertising or matter intended to be distincly displayed immediately upon the booklet being opened. Other advantages of the invention will be apparent from the foregoing description.

What I claim is:

1. A booklet comprising inner leaves and outer leaves hinged to open and close along a determined line, the inner leaves having slots therein extending across the hinging line and into said leaves and the outer leaves being provided with a display strip extending across the hinging line so as to be exposed through said slots when the booklet is opened, said strip being hinged at its side edges to the outer leaves and provided with a central line of fold parallel with its side edges adapting it for movement forwardly and rearwardly through the slots to fold between the leaves when the booklet is closed and to unfold to display position when the booklet is opened.

2. A booklet comprising inner leaves and outer leaves hinged to open and close along a determined line, the inner leaves having slots therein extending across the hinging line and into said leaves and the outer leaves being provided with a display strip integral therewith and extending across the hinging line so as to be exposed through said slots when the booklet is opened, said strip being hinged at its side edges to the outer leaves and provided with a central line of fold parallel with its side edges adapting it for forward and backward movements through the slots to fold between the leaves when the booklet is closed and unfold to display position when the booklet is opened.

3. A booklet comprising inner leaves and outer leaves hinged together to open and close along a determined line, the inner leaves having slots therein extending across the hinging line and into said leaves and the outer leaves being provided with a display strip extending across the hinging line so as to be exposed through said slots when the booklet is opened, said strip being separated at its upper and lower edges from the outer leaves and integrally connected and hinged at its side edges thereto and provided with a central line of fold parallel with its side edges adapting it for forward and backward movements through the slots and to fold in V-fashion between the leaves when the booklet is closed and to unfold to display position when the booklet is opened.

4. A booklet comprising inner leaves and outer leaves hingedly connected at spaced points to open and close along a determined line, the inner leaves having slots therein disposed between said points and extending across the hinging line and into the leaves and the outer leaves being provided with a display strip extending across the hinging line so as to be exposed through said slots when the booklet is opened, said strip being hingedly connected at its side edges with the outer leaves and free from connection at its top and bottom edges with said leaves and provided with a central line of fold parallel with its side edges adapting it for forward and backward movements through the slots and to fold in V-fashion between the leaves when the booklet is closed and to unfold to display position when the booklet is opened.

5. A booklet of the character set forth in claim 1 wherein the booklet is provided with supplemental outer leaves disposed externally of the outer leaves which are provided with the display strip.

6. A booklet of the character set forth in claim 1 wherein the leaves provided with the display strip are covered by supplemental outer leaves, all formed from a French-folded sheet.

7. A booklet of the character set forth in claim 1 wherein the inner leaves and outer leaves are provided with slots and a display strip at their top and bottom portions.

JOHN CANICE MURRAY.